No. 12,156. REISSUED SEPT. 8, 1903.
J. W. LATTIG & C. L. GOODRUM.
TELEPHONE SYSTEM.
APPLICATION FILED AUG. 20, 1903.
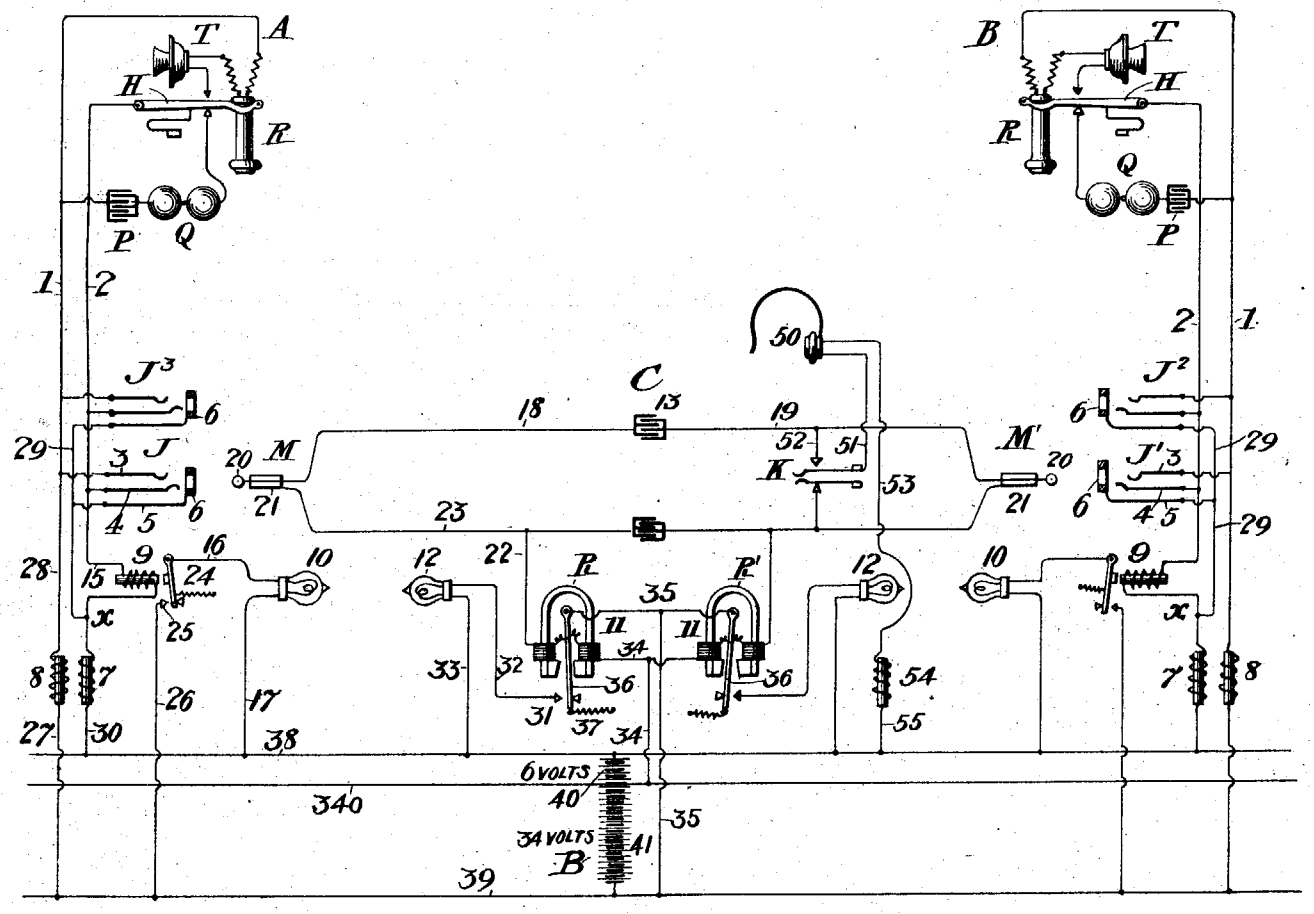
Witnesses:
Grace McFarlan
G. P. Ritter
Inventors:
Jacob W. Lattig and
Charles L. Goodrum
per Edward E. Clement Atty.

No. 12,156. Reissued September 8, 1903.

UNITED STATES PATENT OFFICE.

JACOB WILLIAM LATTIG, OF WEST BETHLEHEM, AND CHARLES LANE GOODRUM, OF PHILADELPHIA, PENNSYLVANIA, ASSIGNORS TO EASTERN TELEPHONE MANUFACTURING COMPANY, OF WESTCHESTER, PENNSYLVANIA, A CORPORATION OF PENNSYLVANIA.

TELEPHONE SYSTEM.

SPECIFICATION forming part of Reissued Letters Patent No. 12,156, dated September 8, 1903.

Original No 722,367, dated March 10, 1903. Application for reissue filed August 20, 1903. Serial No. 170,105.

*To all whom it may concern:*

Be it known that we, JACOB WILLIAM LATTIG, residing at West Bethlehem, in the county of Lehigh, and CHARLES LANE GOODRUM, residing at Philadelphia, in the county of Philadelphia, State of Pennsylvania, citizens of the United States, have invented certain new and useful Improvements in Telephone Systems; and we do hereby declare the following to be a full, clear, and exact description of the invention, such as will enable others skilled in the art to which it appertains to make and use the same.

Our invention relates to telephone-exchange systems, and has for its object the production of a system such that all the exchange functions may be more perfectly performed by simpler apparatus than heretofore.

In telephone-exchange systems, even of small size, it is now customary to employ a centralized or common source of electrical energy from which current is derived for use at the subscribers' stations as well as at the central station. Such centralization of the power-supply has rendered it possible to employ automatic signals throughout—that is, signals which do not require separate acts specially performed by subscriber or operator for their actuation or restoration to normal, but which respond directly to conditions as they are produced or changed in initiating, setting up, responding to, and terminating a conversational connection. Thus in modern systems a subscriber performs no special act in calling, but simply removes his receiver from its hook and places it to his ear ready to converse and to listen, giving no thought to the signal, which, nevertheless, has responded to his closure of the line-circuit. When the operator has set up the desired connection, she need use no switch to ascertain the wishes of the subscribers or the condition of the lines by listening or otherwise, for each cord-circuit is provided with telltale-signals, (usually two in number, one for each subscriber,) which respond faithfully to each change in condition of the line as it is affected by the use or disuse of the subscriber's talking apparatus. Such systems are called "supervisory" systems, the automatic signals affording an opportunity for constant and perfect supervision simultaneously of all the connected lines controlled by each operator.

In most common battery systems the lines are normally extended when in disuse to the main-battery bus-bars through the windings of the line-signal magnet or relay and through the contacts of another relay, which is connected to contacts in the jack or jacks to be energized when a plug is inserted therein and thereupon cut off the extension of the line, whereby the line-signal, being deprived of current, is restored to its normal condition. The cut-off relay thus employed requires a three-conductor cord; but this disadvantage is considered preferable to cutting off in the jack, which is the alternative method. We employ neither method, but avoid the disadvantages of both by using shunts closed when the plugs are inserted.

In most common battery systems the supervisory signals are controlled by ordinary neutral magnets which when brought into connection with the lines respond to the flow of current therein to conceal their signals and when deënergized cause the display of their signals. Obviously when the cord-circuits are disconnected and out of use some provision must be made to prevent the continued display of the signals. This is usually accomplished either by switches in the plug-seats or by extra relays. We avoid all complication in this respect by providing polarized relays connected to conceal their signals when disused or in the absence of current in the lines and to display their signals under the single other condition only.

Upon reading the following description it will be apparent that the signals we describe as supervisory signals might very well have other functions—for instance, replacing line-signals or trunk-signals. We desire it to be expressly understood that we consider ourselves to be the originators of this polarized type of signal controlled by the differential action of divisions of a single battery or generator or of separate units employed in the same relations.

Other features of our invention will appear hereinafter from the description and claims.

In the accompanying drawing, wherein similar parts are pointed out by the same characters throughout, the figure is a diagram illustrating our invention.

In the drawing, A and B represent two subscribers' stations each connected to the central office C by line-wires 1 and 2. As these stations are alike in their equipment and connections, we will describe the station A for both. At this station the line-wires 1 and 2 are normally connected for alternating currents through the condenser P, ringer Q, and switch-hook H, the hook being down. When the receiver is removed from the hook, the bell or ringer circuit is broken and the talking-circuit is completed through the transmitter T and the receiver R.

At the central office the main battery B is connected between bus-bars 38 and 39. The line-wire 1 is connected to the bus-bar 39 through the choke-coil 8 and wires 27 and 28. Line-wire 2 is connected to the bus-bar 38 through the line-relay winding 9, the choke-coil 7, and wires 15 and 30. Line-wires 1 and 2 terminate, respectively, in jack-springs 3 and 4 of the spring-jack J. A test ring or thimble 6 is also provided in the jack, and this is connected, as shown, to the same thimble in all the multiple jacks of the same line and by stem 5 and wire 29 to a point $x$ intermediate the line-relay 9 and the choke-coil 7. The spring 4 is so positioned with regard to the thimble 6 that when a plug is inserted the sleeve thereof will cross the spring and thimble together. The purpose of this will be pointed out later.

The resistance of the coil 8 we usually make about two hundred ohms, that of the relay 9 we make thirteen hundred ohms, and of the coil 7 we make twelve hundred ohms. The relay 9 controls an armature 24, which closes on a contact-point 25, connected by wire 26 to the bus-bar 39. The armature or its equivalent, which may be a twin contact to 25, is connected by wire 16 to the line-signal lamp 10 and thence by wire 17 to the other side of battery at bus-bar 38. It will be understood that these wire connections are not necessarily carried individually to the power-board, but that common wires may form continuations of the bus-bars.

The multiple jacks (represented by $J^3$) are in every respect duplicates of the jack J and are connected in parallel therewith to the wires 1, 2, and 29.

Interconnection of the lines for conversation is effected through the cord-circuit 18 19 23 23. This cord-circuit terminates in plugs M M′ and is conductively divided, but inductively completed, by the condensers 13 and 14. For continuous currents, therefore, a complete conversation-circuit consists of two independent sections which are fed separately. Each plug M or M′ is provided with a tip-contact 20, connected to one side, 18 or 19, of the cord, and with a sleeve-contact 21, connected with the other side, 23, of the cord.

For each cord-circuit two supervisory relays R R′ are provided. We will describe the one, R, for both. This consists in the present case of a horseshoe permanent magnet 11, having windings upon its two poles of approximately seven hundred and fifty ohms resistance, connected by wires 22 and 34 to the cord-conductor 23 on one side and to bus-bar 340 on the other. This bus-bar 340 is a third bus-bar of the main battery, being connected thereto at such a point that the difference of potential between it and the bus 38 will be much less than that between it and bus 39, the former being, for instance, six volts and the latter thirty-four volts where the total voltage of the main battery is forty. All the supervisory relays are connected to this third bus-bar. Its purpose will be referred to in the statement of operation.

Pivoted to swing between the poles of the permanent magnet 11 is an armature 36, which forms one terminal of a normally open circuit 35, whose connection is to the main bus-bar 39 and whose continuation 33 passes from bus 38 to a lamp 12 and so by wire 32 to the contact-point 31 which lies in the path of the armature 36. A spring 37 gives the armature a normal bias to the right; but it is obvious that this may be accomplished in other ways, and, in fact, the entire construction of the relay may be varied in a hundred ways without departing from the spirit of the invention. We reserve to ourselves the right to make this relay in any convenient way, therefore.

The operation of the system so described is as follows: The subscriber A, we will suppose, wishes to converse with subscriber B. He removes the receiver R from the hook H, which thereupon rises and closes the circuit through the talking set and permits direct current from the main battery to pass through the following circuit: bus-bar 39, wire 27, choke-coil 8, wire 28, line-wire 1, talking set R T H, line-wire 2, wire 15, relay 9, choke-coil 7, wire 30, to bus-bar 38. This energizes the relay 9, which thereupon attracts its armature 24 and closes the local-line lamp-circuit as follows: bus-bar 39, wire 26, point 25, armature 24, wire 16, lamp 10, wire 17, to bus-bar 38. The lamp 10 then lights, informing the operator of the call. She responds by inserting the answering-plug M, by the mere insertion of which three results are produced, viz: The cord-conductors are brought into connection with the line-wires, the relay 9 is shunted by the wire 29, stem 5 of the test-thimble, the thimble itself 6, and the sleeve of the plug to spring 4, thus causing the relay-armature to fall away and extinguish the lamp 10, and the supervisory relay is connected to the jack-thimble 6 through the sleeve-conductor 23 of the cord by the following path to battery: wire 22, cord-conductor 23, plug-sleeve 21, jack-thimble 6, stem 5, wire 29, coil 7, wire 30, to bus 38 and battery B, through the upper division 40 of the battery to the bus 340, and by wire 34 back to the relay. This current flowing through the relay-coils under an electromotive force of, say, six volts, if unopposed would suffice to overcome the spring 37 of the armature 36, drawing the latter over to the left and closing on the contact 31, thus lighting the lamp 12 by current flowing in circuit 39 35 36 31 32 12 33 38 to battery. The lighting of the lamp in answering the call is prevented, however, by an opposing current that flows in the following circuit: bus-bar 39, wire 27, coil 8, wire 28, line-wire 1, subscriber's talking set, (which is in service,) line-wire 2, spring 4, sleeve or thimble 6, sleeve of plug 21, wire 23, wire 22, windings of relay R, wire 34 to bus-bar 340, and so to battery. We thus have a divided battery connected so that there are opposed electromotive forces through the windings of the relay R, and as they are unequal the resultant current is in a direction to reinforce the spring 37 and not to oppose it. Thus the supervisory lamp does not light for the calling-line. Having received the number wanted, the operator proceeds to test to determine if the wanted line is free. This she does by throwing over the listening-key K to listening position, and thereby bringing her head-phone into connection with the tip of the calling-plug M′ on one side by the path 51, K, 52, 19, and 20 and into connection with the bus-bar 38 of the main battery on the other side by the path 53, choke-coil 54 55 to bus 38. Now when the tip 20 is touched to the thimble 6 of the wanted line, if the subscriber has called from station B and has not yet been answered a circuit will be completed from the tip through the thimble 6 to line and back and by conductor 28, coil 8, and wire 27 to the bus-bar 39, the current flowing in this circuit producing a characteristic "busy" click in the operator's ear. If the subscriber has not answered a previous call, but another operator has already made connection with his line, then a click will be obtained by current in a circuit through the thimble 6 to the corresponding thimble of the multiple jack already in use and over the sleeve of the plug therein and its cord conductor 23 to the polarized relay R′ and to bus-bar 340. If a cord at another section has already been brought into connection with the wanted subscriber's line and he has answered the call, then both the paths traced will be available and the click will be heard, as a matter of course. If the line is idle, however, no click can be obtained, because the tip 20 and sleeve or thimble 6 will be at the same potential.

It will be observed that connection is made to but one side of the cord from the battery B, and a word of explanation is here in place concerning the current-supply for talking. The battery has the permanent branches 27 and 30, including the choke-coils 8 and 7, respectively, by which direct current is fed to the lines in parallel, the choke-coils preventing any propagation of the changes due to speech in the battery-bridge, but forcing all speech-currents to go across through the cord from line to line past the battery branches. The branch 22 34 through the supervisory relays is solely for the purpose of supplying current to said relays; but incidently it also carries part of the line-supply.

The relays R and R′ having been described, it will now be understood how they perform their dual function under three conditions. Each spring 37 is strong enough to keep the lamp-circuit normally open—that is, when the apparatus is in a condition of idleness. Battery division 40 is sufficient to overcome this, lighting the lamp, and battery division 41 is strong enough to overcome the other and again extinguish the lamp. We do not believe this has ever before been attained successfully in any way.

Having thus described our invention, what we claim, and desire to secure by Letters Patent of the United States, is—

1. In a telephone-exchange system, a subscriber's station and a central station, and a line-circuit interconnecting them, a source of current at the central station, connected to the line, a spring-jack for the line, a cord-circuit and plugs coöperating with said spring-jack, a polarized signal-magnet connected on one side to one side of said cord-circuit, and on the other side to the said source of current at a point intermediate of its terminals so as divide the available electromotive force into two parts, and means at the subscriber's station to control the flow of current in the line, whereby the signal is connected to the line and also in a local circuit to be operated by current in one direction from a portion of the source, in making connection to the line, and is thereafter adapted to be controlled by current in the line in the other direction from the other portion of the source, substantially as described.

2. In a telephone-exchange system, a subscriber's circuit and a subscriber's station with means to determine the flow of current in the line, a source of current bridged across the line, a spring-jack and a cord-circuit with a plug to coöperate with the spring-jack, a polarized signal-magnet connected from an intermediate point of the source to one side of the cord-circuit, a signal controlled by the magnet, and means for normally keeping the signal retired, substantially as described.

3. In a telephone-exchange system, a subscriber's station and a central station and a line-circuit interconnecting them, a source of current connected to the line in a bridge thereof, a cord-circuit for making connection with the line, and a polarized signal-magnet connected from an intermediate point of said source of current to one side of said cord-circuit, with means at the subscriber's station to determine the flow of current in the line, whereby the said signal-magnet may first receive current from one side of said source as connection is made with the line, to operate the signal, and may receive current from the other side of said source at the will of the subscriber, to control the signal, substantially as described.

4. In a telephone-exchange system, a subscriber's station, a central station, and a line-circuit connecting them, a main battery at the central station connected in a bridge of the line-circuit, means at the subscriber's station to determine the flow of current in the circuit, a terminal device for the line, and a cord-circuit for making connection therewith, at the central station, and a polarized signal-magnet connected on one side to an intermediate point of said main battery, and on the other side to one side of the cord-circuit, whereby the said signal-magnet may be put in circuit with one side of the line and division of the battery by the act of making connection with the line, and with the other division of said battery at the will of the subscriber, to receive current in one direction or the other, substantially as described.

5. In a telephone-exchange system, a line and a bridged battery, a polarized signal-controlling magnet having its windings connected on one side to a point in the battery intermediate of its terminals, and nearer one terminal than the other, means operable in making connection with the line to complete the circuit of said magnet through the smaller division in the battery, and means under the control of a subscriber to connect the said magnet with the larger division of the battery, whereby the effect of the first current may be overcome at will, substantially as described.

6. In a telephone-exchange system, a subscriber's station and a central station, and a line interconnecting them, a main battery in a bridge of the line at the central station, a spring-jack connected to the line, a plug and cord-circuit for making connection therewith, a polarized signal-controlling magnet connected on one side to an intermediate point of the main battery, such that the potential differences between said points and the terminals of the battery are unequal, and means operable upon inserting the plug in the jack to bring said magnet into connection on its other side with one division of the line, whereby its circuit is closed to one side of battery, and further means controlled by the subscriber, to connect the two sides of line together whereby the circuit is closed to the other division, substantially as described.

In testimony whereof we affix our signatures in presence of two witnesses.

JACOB WILLIAM LATTIG.
CHARLES LANE GOODRUM.

Witnesses:
L. A. POTTEIGER,
TILLIE I. MACCAULEY.